United States Patent [19]
Grossi

[11] Patent Number: 4,796,521
[45] Date of Patent: Jan. 10, 1989

[54] COMPACT AUTOMATIC COFFEE-MAKING MACHINE MORE PARTICULARLY FOR DOMESTIC USE

[76] Inventor: Lucio Grossi, Via Sylva, 30, Bergamo, Italy

[21] Appl. No.: 112,941

[22] Filed: Oct. 22, 1987

[30] Foreign Application Priority Data

Oct. 31, 1986 [IT] Italy .............................. 22197 A/86

[51] Int. Cl.⁴ ............................................. A47J 31/34
[52] U.S. Cl. ................... 99/287; 99/289 R; 99/297; 99/302 P
[58] Field of Search ............ 99/279, 287, 295, 289 R, 99/300, 302 P, 302 R; 426/433

[56] References Cited

U.S. PATENT DOCUMENTS

| | | | |
|---|---|---|---|
| 3,349,690 | 10/1967 | Heier | 99/289 |
| 3,369,478 | 2/1968 | Black | 99/297 |
| 3,660,117 | 5/1972 | Neely | 99/289 |
| 3,760,712 | 9/1973 | Rossi | 99/289 |

*Primary Examiner*—Robert W. Jenkins
*Attorney, Agent, or Firm*—Herbert Dubno; Ronald Lianides

[57] ABSTRACT

The automatic coffee-making machine according to the invention comprises a filter carrier having on its base a movable filter for filtering the coffee infusion, there being introducible into the carrier in sealing-tight manner a piston having means for delivering pressurized hot water supplied by a metering unit, the piston being operated for its movements of descent, introduction into the filter carrier element, compression of the coffee powder, raising and lateral rotation by a rod having resilient piston-pulling means and connected to a rotating disc actuated by a geared motor, means being provided to support and guide the piston in its movement, the latter means providing an irreversible transmission of the movement from the motor to the piston, automatic means being provided to expel the spent coffee powder and to supply fresh powder to the filter carrier.

15 Claims, 7 Drawing Sheets

COMPACT AUTOMATIC COFFEE-MAKING MACHINE MORE PARTICULARLY FOR DOMESTIC USE

FIELD OF THE INVENTION

This invention relates to an automatic coffee making machine, particularly for domestic use.

BACKGROUND OF THE INVENTION

Various kinds of apparatus are used for preparing coffee, more particularly espresso coffee—i.e., an infusion produced with hot water and coffee powder—and in all of them water at a high temperature and an appropriate pressure passes through a layer of coffee powder, the resulting infusion then being collected.

To produce a high-quality coffee the infusion water must be at a temperature below the boiling point in order to obviate removing from the coffee powder not only the aromatic ingredients which give the beverage its taste, but also undesirable and in some cases harmful ingredients which are evolved from the coffee powder only at temperatures above the boiling point of water.

Consequently, apparatuses in which water passes through the coffee powder at a temperature below the boiling point and which therefore yield a high-quality product are very widely used both commercially and privately.

More particularly, for domestic use a compact and low-cost coffee-making machine is required.

In automatic coffee-making machines the coffee powder is disposed in a filter carrier having a filter for retaining the coffee powder and discharging the infusion produced. A piston compresses the powder to an appropriate extent and hot water is supplied by way of the piston to produce the infusion. A driving element is therefore necessary to introduce the piston into the filter carrier and to retain the piston thus positioned while hot pressurized water is supplied.

Operating units using irreversible geared motors can be used for this purpose but such devices are expensive and are unsuitable for a domestic machine. Similar problems arise in connection with the other operating steps required, such as metering of the water, control of the cycle and so on.

OBJECT OF THE INVENTION

It is therefore an object of the present invention to provide a compact domestic machine which is reliable and which automatically produces a coffee of the same quality as the coffee produced by the larger machines used commercially but which is still compact and inexpensive.

SUMMARY OF THE INVENTION

These results are provided by the present invention, in which an automatic coffee-making machine has a filter carrier having on its base a movable filter for filtering the coffee infusion, there being introducible into such carrier in a sealing-tight manner a piston having means for delivering pressurized hot water supplied by a metering unit, the piston being operated for its movements of descent, introduction into the filter-carrier element, compression of the coffee powder, raising and lateral rotation by a rod having resilient piston-pulling means and connected to a rotating disc actuated by a geared motor, means being provided to support and guide the piston in its movement, the latter means providing an irreversible transmission of the movement from the motor to the piston, automatic means being provided to expel the spent coffee powder and to supply fresh powder to the filter carrier.

The means for supporting and guiding the piston in its movement take the form of a vertical upright disposed on the machine casing, a sleeve being slidable on the upright and carrying transversely a horizontal rod to whose end the piston is attached, the distance between the place at which the piston is attached to the horizontal rod and the sleeve being greater than the length thereof so that a vertical force exerted on the piston causes the sleeve to be clamped fast to the upright.

The rod and the resilient piston-pulling means are connected to the horizontal rod supporting the piston at a short distance from the sleeve so that the forces exerted on the rod by the last-mentioned means do not clamp the sleeve to the upright.

The piston-actuating rod is connected at one end to a pin of a disc rotated by a geared motor and is formed at its opposite end with a slot whose axis is aligned with the pin and in which the piston-carrying rod is introduced, the slot bottom edge acting on the rod during the rising movement of the piston, the rod also being connected to the disc pin by way of a spring or the like producing the descent of the piston with a force substantially independent of variations in the thickness and resistance of the powder to be compressed, the bar being slidable in the slot in the rod during this descent phase.

The piston-carrying rod slides in a slot in a plate rockingly mounted on the machine casing laterally of the direction of rod movement, the top of the slot being at a level below the maximum lift of the piston, the plate rotating around its own support pin or pivot during the rising movement of the piston when the rod contacts the slot apex, means being provided for so interconnecting the piston-carrying rod and the plate that they co-rotate, the latter means being adapted to produce a lateral inclination of the piston at the top of its rising movement.

A spatula for removing spent coffee powder and a guide chute for introducing fresh powder into the filter-carrying element are secured to the rocking plate, the spatula and chute rocking with the plate at the top of the rising movement of the piston.

The moving filter in the filter carrier can be rasied, by way of mechanical transmission elements associated with the piston-carrying rod, as far as the top edge of the filter carrier, the filter carrying the spent filter powder above it in such movement into a position in which the powder can be removed by the spatula.

The unit metering the infusion water comprises a water-collecting reservoir connected by way of an automatic shut-off valve to a bellows tank whose volume can be varied to suit the dose for a coffee or of a number of coffee in the case of a multiple machine, the bellows tank being connected to a pump supplying the water to a heating unit and therefrom to the piston.

The line from the pump to the heating unit also comprises an automatic valve for placing the piston on discharge; the automatic shutoff valves of the line feeding the bellows tank and for placing the piston on discharge are activated by transmission means associated with a lever operated by a camming profile on the disc rotated by the geared motor.

Conveniently, the bellows tank has a float associated with an electric sensor adapted to stop the pump upon the bellows tank emptying.

The rotating disc driven by the geared motor and producing the piston movements also has a number of cams associated with electrical switches initiating the consecutive operating phases of the machine during one complete revolution of the disc.

Conveniently, the water flow passages in the piston and filter can be in the form of annular flow passages bound by elements performing a relative movement in every cycle in order to remove any deposits in the passages.

The machine according to the invention has provision for metering the coffee powder supplied to the filter carrier at every cycle; such provision for metering the coffee powder can be associated with a coffee grinder.

BRIEF DESCRIPTION OF THE DRAWING

Further details will become more apparent from the following description reference being made to the accompanying drawings, in which.

SPECIFIC DESCRIPTION

Figure 1:
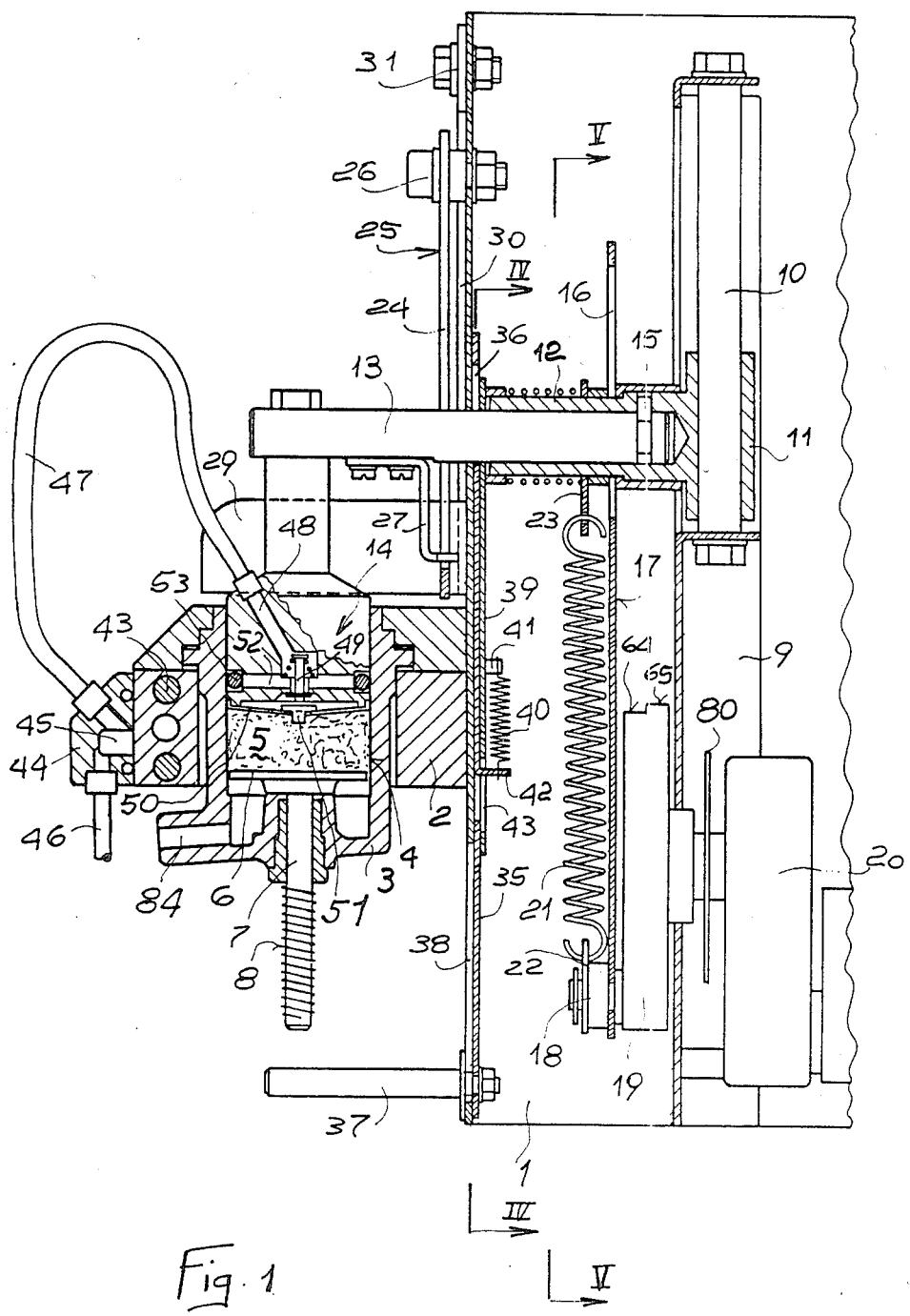
FIG. 1 is a longitudinal section through the machine according to the invention taken on the line I—I of FIG. 2.

The machine according to the invention mainly comprises an outer casing 2 having secured thereto a support 2 which receives a filter carrier 3 formed with an internal cavity 4 adapted to receive coffee powder 5 from a coffee grinder 33' feeding through a coffee meter 33" the cavity 4 being bounded at the bottom by a blind filter 6 having a pin 7 slidable in the filter carrier 3 and retained in the lowered position by a spring 8. The casing 1 has a inner wall 9 carrying an upright 10 on which a sleeve 11 can slide.

The sleeve 11 has a cross-tube 12 receiving a rod 13 having; secured to the end thereof a piston 14 introducible in a sealing-tight manner into the filter carrier cavity 4. The rod 13 is freely rotatable in the tube 12 and is secured axially internally by a pin 15.

The tube 12 is engaged in a slot-like aperture 16 formed in a rod 17 whose bottom end is engaged by a pin 18 of a cam disc 19 rigidly secured to the output shaft of a geared motor 20. The tube 12 is also secured to the pin 18 by way of a spring 21 and respective brackets 22, 23.

Figure 2:
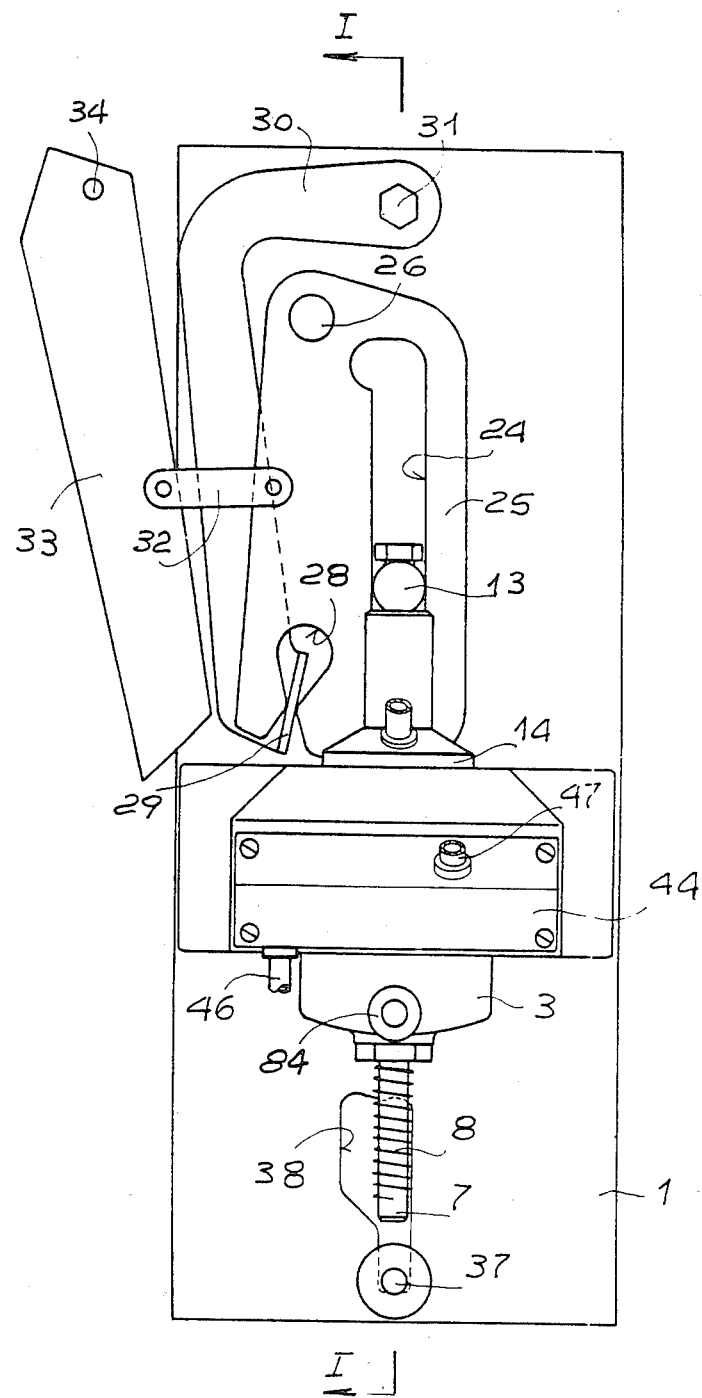
FIG. 2 is a front elevational view of the machine of FIG. 1.

As is also shown in FIG. 2, the rod 13 is slidingly engaged in a shaped slot 24 formed in a plate 25 rotatable around a pin 26. A bent member 27 is also disposed in the slot 24 and provides a connection during rotation between the rod 13, the piston 14 attached thereto and the plate 25.

The plate 25 is also formed with a recess 28 in which a blade 29 engages, the blade 29 being carried by an arm 30 rotatable around a pin 31. By way of a link 32 the plate 25 is connected to a chute 33 rockingly mounted on a pin 34 carried by a lateral part (not shown) of the structure.

Figure 4:
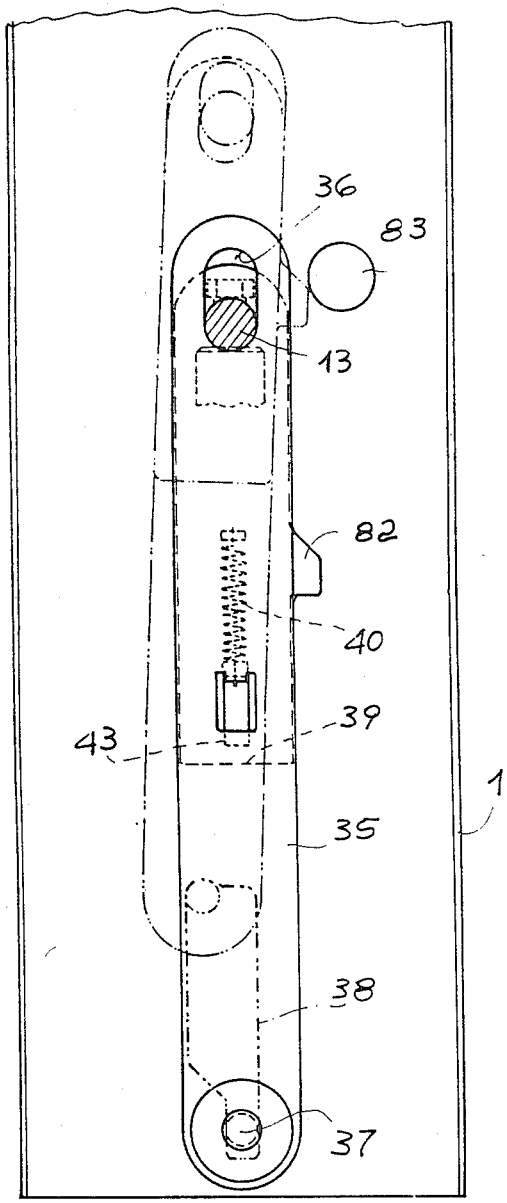
FIG. 4 is a diagrammatic section taken on the line IV—IV of FIG. 1.
Figure 5:
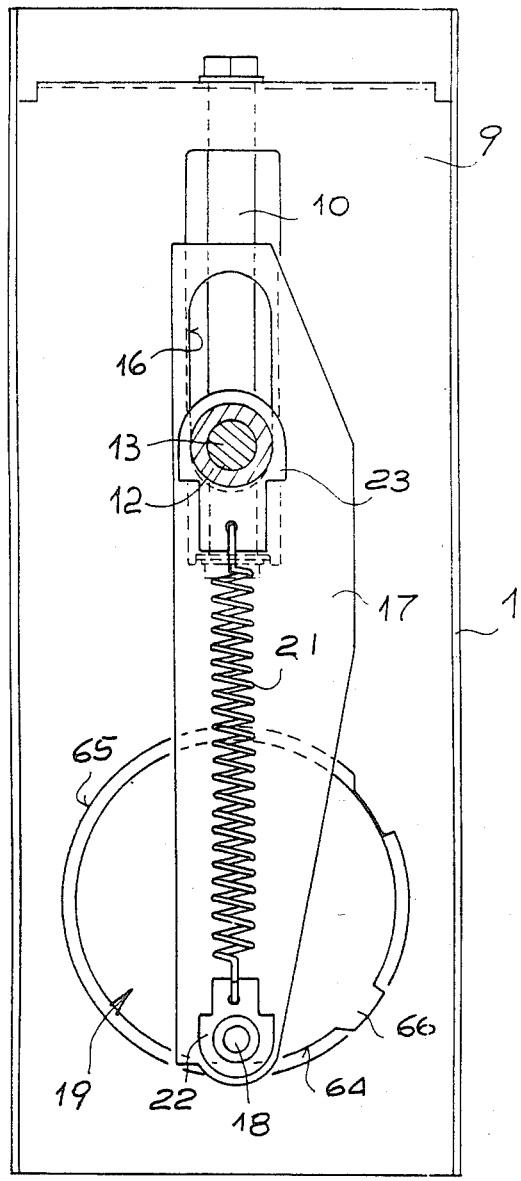
FIG. 5 is a section taken on the line V—V of FIG. 1.

As can be gathered from FIG. 4, a slider 35 is also engaged on the rod 13 and is formed with a slot 36 through which the rod 13 extends and has at its bottom end a projecting pin 37, the same projecting outside the casing 1 through a shaped aperture 38, the contour of which is indicated in FIG. 2 in solid lines and in FIG. 4 in dot-dash lines.

A plate 39 also engaged on the rod 13 bears on the slider 35 and is connected thereto by way of a spring 40 attached at one end to a pin 41 projecting from plate 39 and at its opposite end to a bent strip 42 of the slider 35, the strip 42 extending through the plate 39 by way of slot 43 formed therein and thus ensuring that the plate 39 and slider 35 are always in a position of alignment.

The support 2 receives internally electrical resistances 43 which extend at least to some extent around the filter carrier 3 and a heating chamber 44 is placed on contact with the support 2, the chamber 44 having an internal cavity 45 having an inlet duct 46 and an outlet duct 47.

The outlet duct 47 extends to the piston 14 where it is connected to an internal duct 48 which, by way of a calibrated aperture having a moving internal element 49, extends to a blind filter 50 having a sliding closure member 51.

Internal ducts 52 supply pressurized water outwardly against a ring gasket 53 to thrust the same radially on to the inner wall of the cavity 4 and thus make the piston 14 sealing-tight.

Figure 3:
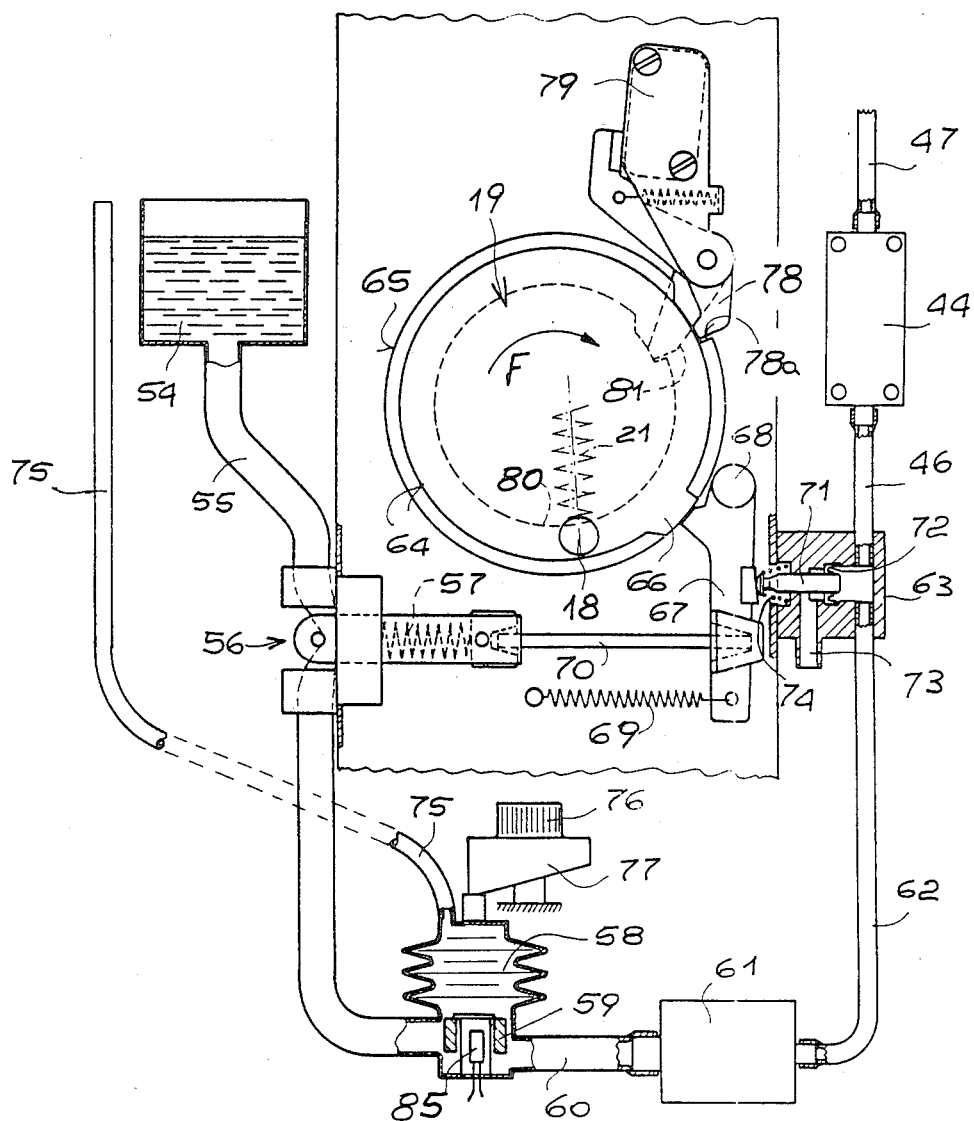
FIG. 3 shows the water circuit of the machine.

The water supply circuit of the machine according to the invention is shown diagrammatically in FIG. 3 and comprises a water-collecting reservoir or tank 54 from which a flexible line 55 extends, encountering a valve 56 adapted to deform the line 55 until completely closing it through the agency of a spring 57, and a bellows tank 58 having a float level detector 59. A line 60 extends from the tank 58 to a pump 61 whose discharge line 62 is connected to a discharge valve 63 and therefrom to a line 46 feeding a heating chamber 44. A cam disc 19 has two profiles 64, 65; the first profile 64 has a projection 66 adapted to engage with a cam follower 67 rotatable around a pin 68 and maintained in contact with the profile 64 by a spring 69 stronger than the spring 57; the cam follower 67 is connected to the valve 56 by way of a transmission rod 70.

The discharge valve 63 has a sliding lid 71 engageable with the gasket 72 to close the passage from line 62 towards discharge line 73; a spring 74 maintains the lid 71 in contact with the cam follower 67.

The tank 58 has a capillary duct 75 which extends to the level of the tank 54; by means of a knob 66 connected to a rotating cam profile 77, the volume of the bellows tank 58 can be varied by compressing same to various extents.

Cam profile 65 is associated with a lever 78 acting on a switch 79; a further cam profile 80 rigidly secured to the shaft of the geared motor 20 is in turn associated with a lever 81 acting on another associated switch; such switches initiate the consecutive operating phases for preparing coffee during one complete revolution of the geared motor 20 which drives the cam profiles 64, 65 and 80.

Figure 6:
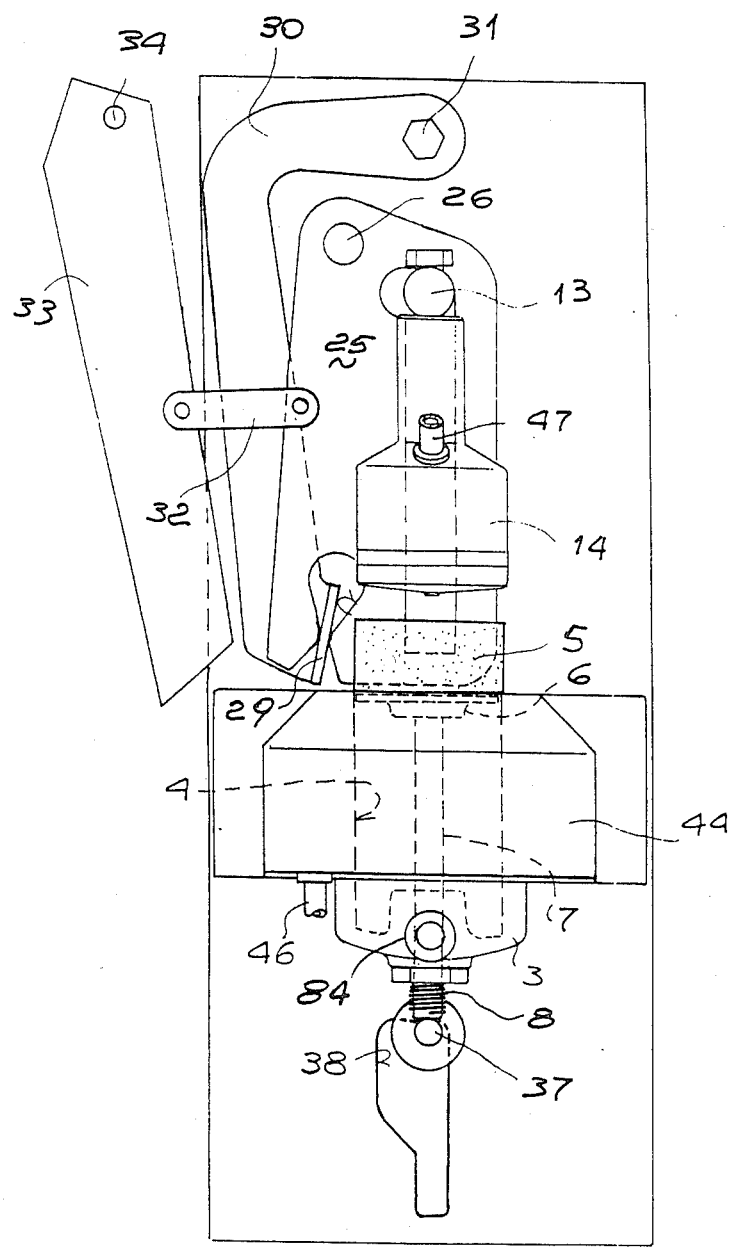
FIG. 6 is a front elevational view of the machine of FIG. 1 in the open position.
Figure 7:
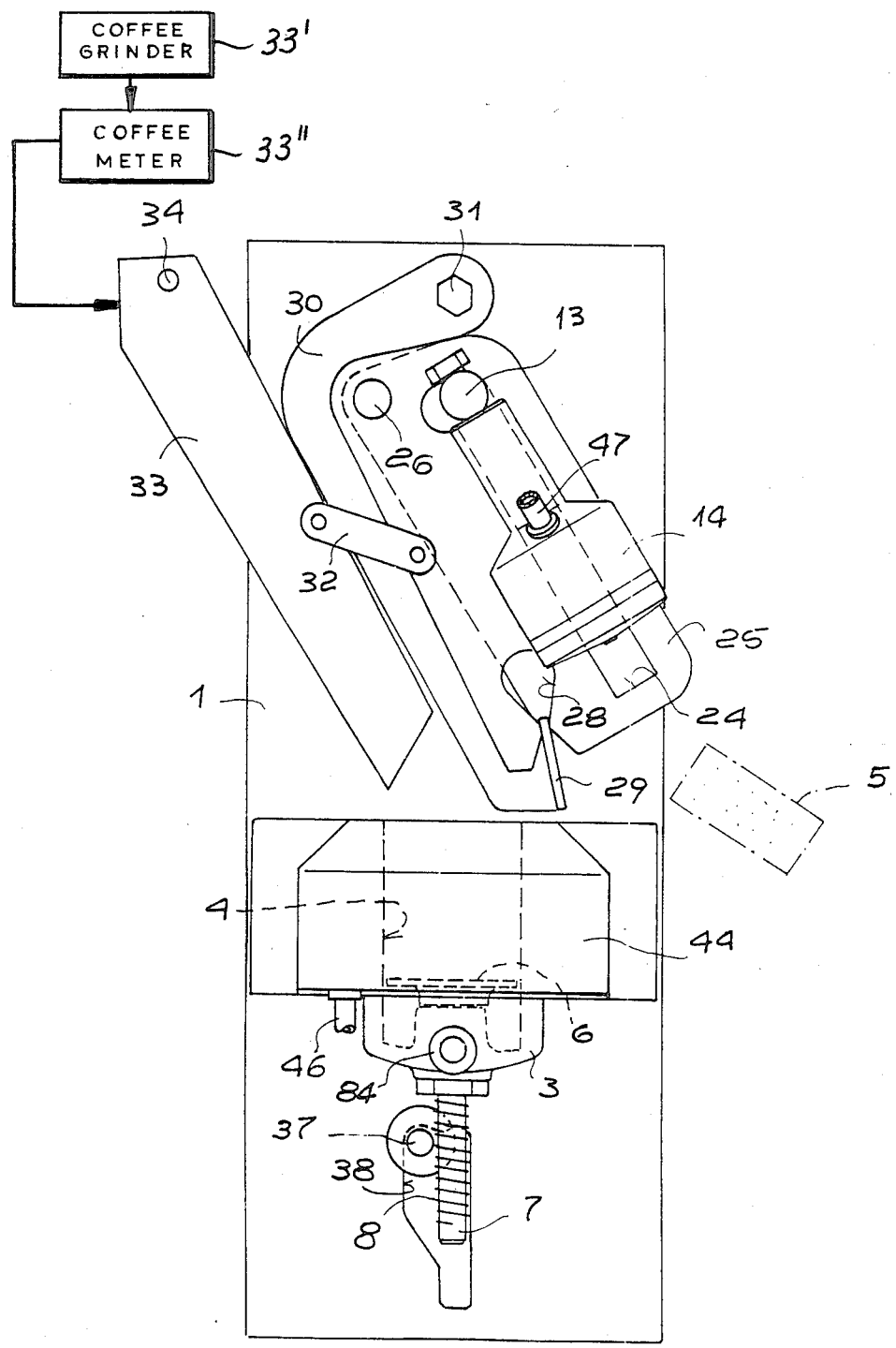
FIG. 7 is a front elevational view of the machine of FIG. 1 in the position for expelling the spent charge of coffee and of loading fresh coffee powder.

At the start of the working cycle of the machine, the cam disc 19 is disposed with the pin 18 at an upper position; correspondingly, the valves 56, 63 are open and the piston 14 is in the raised position shown in FIG. 6 with the spent coffee charge 5 raised on the filter 6 above the cavitiy 4. When the machine starts, the piston 14 rises further until reaching a position in which the rod 13 strikes the top end of the slot 24 to rotate the plate 25 around the pin 26; through the agency of the bent member 27 the piston 14 is rotated and opens the mouthpiece of the cavity 4, the spent coffee charge 5 simultaneously being removed by means of spatula 29, as shown in chain-dotted line in FIG. 7.

At the highest point of the rising movement of the rod 13, together with the rotation of the plate 25 and the arm 30 carrying the blade 31, lateral ridge 82 of plate 39 which slides relatively to the slider 35, the same having been locked upon the complete rising of the rod 7, strikes a stationary abutment 83 and the plate 39 and slider 35 rotate through a reduced angle causing the pin 37 to disengage from the rod 7 so that the filter 6 can return to its lowered position through the agency of the spring 8 while the pin 37 can then rotate into its bottom position during the descent of the rod 13 by sliding in the slot 38 laterally of the rod 7.

A metering and grinding facility associated with the machine but not shown and possibly of known kind supplies coffee powder by way of the chute 33 to the cavity 4. Subsequent rotation of the motor rotates the cam disc 19 in the direction indicated by an arrow F in FIG. 3 and so the pin 18 descends and acts by way of the spring 21 to lower the rod 13 sliding; the same slides in the slot 24 of the plate 25 and rotating the same so that the piston 14 takes up a vertical position and the spatula 29 retracts.

Continuing its downward movement under the influence of the spring 21 the piston 14 engages in the recess or cavity 4 and compresses the coffee powder therein at a pressure which depends upon the stiffness of the particular spring 21 used and which is very little influenced by the quantity of powder metered, the percentage elongation variation of the spring arising in compression of different powder dosages being slight.

Independent movement of the rod 13 and rod 17 is ensured by the sliding of the rod 13 in the slot 16.

By way of the valve 56 which stays open, the bellows tank 58 is kept full from the tank 54, water rising through the capillary duct 75 to the level of the exposed surface in the tank 54; consequently, water dosage is relatively accurate and is affected only by the variation of the level reached in the capillary 75 and by the very reduced volume thereof due to the level variations in the tank 54; also, water dosage can readily be altered by varying the volume of the bellows 58 by means of the cam disc 77.

Upon completion of rotation of the cam disc 19, corresponding to complete compression of the coffee powder 5 in the filter carrier 3, the disc 19 is stopped by switch 79 in the position shown in FIG. 3, lever 78 of switch 79 engaging in notch 78a in cam profile 65. The pin 18 has therefore been rotated through a few degrees, in the direction indicated by the arrow F, stopping to before the bottom dead, center position; in this position the spring 21, which is extended to compress the coffee powder and which is operative upwardly, tends to rotate the cam disc 19 against the direction indicated by the arrow F, this rotation being opposed by the lever 78 which is engaged in the notch 78a in the member 65 so as to maintain the position of the disc 19 without transmitting forces to the geared motor 20. With the disc 19 in its blocked position the valve 56 is closed because of the rotation of the cam follower 67 caused by the projection 66, the discharge valve 63 also closes and the machine is ready to supply the coffee.

The switches associated with the movement of the cam disc 19 control the starting of the pump 61 which is conveniently, of the vibratory kind and supplies the water in the bellows 58 to the heater 44 and therefrom through duct 47 to the inside of the piston 14.

The pressure of the hot water supplied therefore reduces the efflux through the calibrated aperture 49 and moves the central mobile element thereof axially, the sliding movement of the mobile element preventing the formation of deposits of scale around the aperture, and water is supplied to the pressed coffee powder through another blind filter 50 on said piston, the same being formed with an annular flow aperture in which a lid 51 is slidable with a clearance determining the actual size of the passage. The piston 14 is therefore retained in position by the supply pressure of the water without any need for the geared motor 20 to be oversized for this reason, since the thrust produced by the pressure is exerted on the rod 13 with a leverage considerably greater, for example, three times as great, as the guide length of the sleeve 11 on the upright 10.

The sleeve 11 is then jammed because of the thrust exerted on the end of the rod 13 and so the piston position is retained without the geared motor 20 having to perform this function; consequently, the geared motor 20 can be dimensioned without having to withstand stressing due to retaining the position and so costs considerably less.

The pressure in the cavity 4 always produces a slight yielding of the piston 14 due to the take-up of clearances and to the resilient deformation under load of the rod 13; the resulting rearward movement of the piston 14 leads to a gap arising between the surface of the filter 50 and the coffee powder, such gap conveniently being at most 1 mm. The gap is advantageous since it helps to provide complete and uniform distribution of the pressurized water on the coffee with optimum effects over the entire surface.

This therefore leads advantageously to an effective use of "blind filters" formed with a single flow aperture in which a mobile element is engaged slidingly, as described in detail in the Applicant's earlier Pat. No. 24 844 A/81 as regards both the bottom filter, through which the coffee produced passes, and as regards the top filter disposed on the piston and serving to distribute the water over the surface of the coffee powder, thus leading to the flow passage always being kept free of scale or coffee residues while ensuring that the flow of water engages all the powder and does not leave dead unirrigated zones.

Conventional perforate filters can be used instead of the filters according to the patent application No. 24 844 A/81 referred to.

The coffee then goes through the filter 6 and is collected inside the filter carrier 3 from which it issues through a spout 84; a sensor 85 associated with the float 59 stops the pump 61 when the bellows tank 58 empties.

The cam disc 19 therefore completes its rotation, produced by the geared motor 20, raising the rod 13 and the piston 14; this raising, with the sleeve 11 sliding on the upright 10, can occur in this case with a reduced force since the distance between the point at which the rod 17 acts on the cross-tube 12 from the upright 10 is less than the guide length of the sleeve 11 on the upright 10 or is in any case such as not to cause any jamming.

The piston 14 is then withdrawn from the cavity 4 and raised until it is near the position in which the rod 13 abuts the top end of the slot 24, the piston 14 then being locked in such position.

As the rod 13 rises it draws with it the slider 35 and plate 39 and, through the agency of the pin 37 in engagement with the rod 7, raises the blind filter 6 and expels the spent charge of coffee powder 5 from the cavity 4. When the cam disc 19 has rotated past the position in which the projection 66 abuts the lever 67, the same, as previously stated, is rotated by the spring 69; this movement allows the lid 71 of the valve 63 to move, such lid moving rearwardly and placing the piston 14 and the line 62 on discharge before raising the piston 14, thus enabling the sleeve 11 to disengage from its jammed position produced by the forces a rising because of the water pressure, so that the sleeve 11 can then slide readily along the upright 10.

The machine according to the invention therefore provides reliable operation in a very simple and low-cost construction, the piston being pressed against the coffee powder and the hot pressurized water being supplied in the correct position without the need for any powerful actuating elements.

The machine also ensures that the compression of the coffee powder is substantially constant and independent of the actual powder dosage, the compression being determined by the resilient restoring force of the spring 21 which is affected little by minor percentage variations of the extension of the spring 21 and which is unaffected by a fixed travel of the compressing piston 14.

Another advantage is the provision of a very simple and efficient water-metering circuit using a reduced number of cheap components.

This combination of features together with the reduced dimensions and the high reliability makes the machine particularly suitable for family use.

Those parts of the machine which relate to cycle control, coffee supply and distribution and so on can be of known kind and have therefore not been described in detail.

A wide range of variants can be introduced therefore without departing from the scope of the invention and its general features.

What is claimed is:

1. An automatic coffee-making machine, comprising:
    a base;
    a filter carrier formed with an internal cavity and mounted on said base;
    a movable filter disposed at a lower end of said cavity for filtering a coffee infusion;
    means on said base for introducing powdered coffee into said cavity;
    a movable piston introducible into said cavity and forming a watertight seal therewith, said piston provided with means for delivering into said cavity pressurized hot water supplied by a metering unit on said base;
    a geared motor mounted on said base;
    at least one cam disc rotatably driven by said motor;
    resilient pulling means connected between said cam disc and said piston for drawing said piston into said cavity and compressing said powdered coffee;
    a rod connected between said cam disc and said piston for displacing said piston out of said cavity;
    guide means on said base for supporting and guiding said piston in the movement thereof, said guide means providing an irreversible transmission of the movement from said motor to said piston; and
    expelling means on said base for automatically removing from said cavity said powdered coffee when spent.

2. The machine defined in claim 1 wherein said guide means includes an upright mounted on said base, a sleeve slidably mounted on said upright, a transverse bar rotatably mounted at one end thereof on said sleeve, the other end of said bar being connected to said piston, the distance between said other end and said sleeve being greater than the length of said sleeve, whereby an upright force exerted on said piston causes said sleeve to become jammed on said upright preventing displacement of said sleeve.

3. The machine defined in claim 2 wherein said rod and said resilient pulling means are connected to said bar at a distance from said sleeve which is less than the length thereof, whereby sleeve is freely displaceable on said upright by the forces exerted on said bar by said rod and resilient pulling means.

4. The machine defined in claim 2 wherein said cam disc is provided with a pin, one end of said rod being rotatably mounted on said pin, the other end of said rod being formed with an elongated slot having an axis intersecting an axis of said pin and being traversed by said bar, one end of said slot acting on said bar during displacement on said piston from said cavity, said resilient pulling means being a spring connected between said bar and said pin and producing a force substantially unaffected by variations in thickness and resistance of said powdered coffee, said bar being slidable in said slot.

5. The machine defined in claim 2, further comprising a plate pivotally mounted on said base to swing laterally to the direction of movement of said bar and formed with an elongated second slot traversed by said bar, one end of said second slot being short of the maximum displacement of said bar by said rod, whereby said plate swings around a pivot offset from said second slot when said bar engages said one end of said second slot at the maximum displacement of said bar for complete withdrawal of said piston from said cavity, and interconnecting means between said bar and said plate adapted for the co-rotation thereof for the inclination of said piston.

6. The machine defined in claim 5 wherein said expelling means is formed by a spatula mounted on said plate and said means for introducing powdered coffee into said cavity is formed by a guide chute pivotally mounted on said base and secured to said plate to swing therewith, whereby said chute is aligned with said cavity.

7. The machine defined in claim 6 further comprising means for displacing said movable filter to an upper open end of said cavity, whereby spent powdered coffee disposed on said movable filter can be removed by said spatular when said plate swings.

8. The machine defined in claim 1 wherein said metering unit includes a water-collecting reservoir connected through an automatic shut-off valve to a bellows tank having a variable volume adjustable to suit the type or amount of coffee used or to a plurality of machines, said bellows tank further connected to a pump supplying water to a heating unit and therefrom to said piston.

9. The machine defined in claim 8, further comprising a second automatic valve connected between said pump and said heating unit for discharging the pressurized hot water supplied to said piston, whereby the upright force exerted thereon is relieved.

10. The machine defined in claim 9 wherein said first and second automatic valves are operatively connected by transmission means to a cam follower operated by a projection formed on said at least one cam disc.

11. The machine defined in claim 8 wherein said bellows tank is provided with a float associated with an electric sensor adapted to stop said pump when said bellows tank is empty.

12. The machine defined in claim 1, further comprising a plurality of cam discs rotatably driven by said motor, said plurality of cam discs formed with a plurality of projections operatively connectable with a plurality of electrical switches respectively associated therewith, said switches initiating consecutive operating phases of the machine during one complete revolution of said discs.

13. The machine defined in claim 1 wherein said means for delivering pressurized hot water into said cavity includes a first aperture formed in said piston and provided with a first movable element, and a second filter disposed at a lower end of said piston and formed with a second aperture provided with a second movable element, said first and second movable elements performing reciprocating movements during every operating cycle of the machine to remove any deposits in the respective apertures.

14. The machine defined in claim 1 wherein said means for introducing powered coffee into said cavity includes a coffee meter for delivering measured amounts of coffee at the start of each cycle.

15. The machine defined in claim 14, further comprising a coffee grinder for making and feeding powdered coffee to said coffee meter.

* * * * *